(12) United States Patent
Zhao

(10) Patent No.: US 12,720,580 B2
(45) Date of Patent: Aug. 25, 2026

(54) SIDELINK COMMUNICATION RESOURCE SELECTION METHOD AND APPARATUS

(71) Applicant: Beijing Xiaomi Mobile Software Co., Ltd., Beijing (CN)

(72) Inventor: Qun Zhao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 258 days.

(21) Appl. No.: 18/719,609

(22) PCT Filed: Dec. 15, 2021

(86) PCT No.: PCT/CN2021/138474

§ 371 (c)(1),
(2) Date: Jun. 13, 2024

(87) PCT Pub. No.: WO2023/108499

PCT Pub. Date: Jun. 22, 2023

(65) Prior Publication Data

US 2025/0048403 A1 Feb. 6, 2025

(51) Int. Cl.
*H04W 72/40* (2023.01)
*H04W 28/26* (2009.01)

(52) U.S. Cl.
CPC ........... *H04W 72/40* (2023.01); *H04W 28/26* (2013.01)

(58) Field of Classification Search
CPC . H04W 72/40; H04W 28/26; H04W 72/0446; H04W 72/0453; H04W 72/02;
(Continued)

(56) References Cited

U.S. PATENT DOCUMENTS

2020/0413295 A1* 12/2020 Li ........................ H04W 76/14
2021/0160876 A1* 5/2021 Osawa ................. H04W 72/20
(Continued)

FOREIGN PATENT DOCUMENTS

CN 110972176 A 4/2020
CN 111727624 A 9/2020
CN 112261613 A 1/2021
CN 112385291 A 2/2021
CN 112512008 A 3/2021
CN 112840708 A 5/2021
CN 113678491 A 11/2021
(Continued)

OTHER PUBLICATIONS

Huawei, HiSilicon, "Sidelink resource allocation to reduce power consumption",3GPP TSG RAN WG1 Meeting #103-e, R1-2007615,E-meeting, Oct. 26-Nov. 13, 2020.
(Continued)

*Primary Examiner* — Nimesh Patel
(74) *Attorney, Agent, or Firm* — Volpe Koenig

(57) ABSTRACT

A sidelink communication resource selection method, including: in a resource selection process triggered by a periodic sidelink transmission, a user equipment (UE) at a transmitting end performing resource selection according to a second resource selection mode in a case that a transmission resource pool of the UE supports periodic resource reservation, the UE is configured to perform partial listening-based resource selection, and to-be-selected time-frequency resources do not meet a condition required by a first resource selection mode, where the first resource selection mode is used for selecting a resource for a sidelink transmission in which periodic resource reservation is performed, and the second resource selection mode is used for selecting a resource for a sidelink transmission in which periodic resource reservation is not performed.

18 Claims, 4 Drawing Sheets

Perform, in a resource selection process triggered by a periodic sidelink transmission, resource selection according to a second resource selection mode in a case that a transmission resource pool of the UE supports periodic resource reservation, the UE is configured to perform partial listening-based resource selection, and to-be-selected time-frequency resources do not meet a condition required by a first resource selection mode

S301

S3011, Select candidate time-frequency resources that meet a second listening condition and of which the quantity is not less than a second threshold from the to-be-selected time-frequency resources S3012, Perform random resource selection among the to-be-selected time-frequency resources

(58) Field of Classification Search

CPC ..... H04W 76/14; H04W 72/23; H04W 92/18; H04W 72/56; H04W 74/0808; H04W 16/14; H04W 72/044; H04W 72/21; H04W 72/0473; H04W 72/25; H04W 72/542; H04W 72/12; H04W 4/46; H04W 4/40; H04W 72/20; H04W 72/04; H04W 72/541; H04W 8/005; H04W 72/543; H04W 72/54; H04W 76/15; H04W 76/10; H04W 76/16; H04W 84/18; H04W 52/46; H04W 72/30; H04W 72/563; H04W 16/28; H04W 16/10; H04W 4/08; H04W 88/02; H04W 72/121; H04W 52/0225; H04W 72/51; H04W 72/53; H04L 5/0048; H04L 1/1887; H04L 5/001; H04L 5/0007; H04L 1/1854; H04L 27/26; H04L 5/0082; H04L 41/16; H04L 5/0005; H04L 5/0091; H04L 41/5009; H04L 43/16; H04L 5/0023; H04L 47/24; H04L 49/205; Y02D 30/70; H04J 11/00; G06N 20/00; H04B 17/345; H04B 17/318; H04B 17/373; H04B 7/0626; H04B 7/06966; H04B 7/088; H04B 7/0617; H04B 7/0695; H04B 17/391

See application file for complete search history.

(56) References Cited

U.S. PATENT DOCUMENTS

| | | | | |
|---|---|---|---|---|
| 2021/0176669 | A1* | 6/2021 | Fakoorian | H04W 28/26 |
| 2021/0385696 | A1 | 12/2021 | Yang et al. | |
| 2022/0086803 | A1* | 3/2022 | Li | H04W 72/0453 |
| 2022/0124683 | A1* | 4/2022 | Zhao | H04L 5/0051 |
| 2023/0164637 | A1* | 5/2023 | Zhao | H04W 28/26<br>370/330 |
| 2024/0073871 | A1 | 2/2024 | Zhao | |

FOREIGN PATENT DOCUMENTS

| | | | |
|---|---|---|---|
| WO | 2018084575 | A1 | 5/2018 |
| WO | 2020015345 | A1 | 1/2020 |
| WO | 2020052391 | A1 | 3/2020 |

OTHER PUBLICATIONS

NTT Docomo, Inc.“ Details of resource selection by pedestrian UE using partial sensing”,3GPP TSG RAN WG1 Meeting #88, R1-1702771, Athens, Greece Feb. 13-17, 2017.

Fujitsu,“Discussion on Reservation and Sensing based Resource Selection Methods for NR-V2X Sidelink Communication”, 3GPP TSG RAN WG1 #96b, R1-1905376, Xi’an, China, Apr. 8-12, 2019.

* cited by examiner

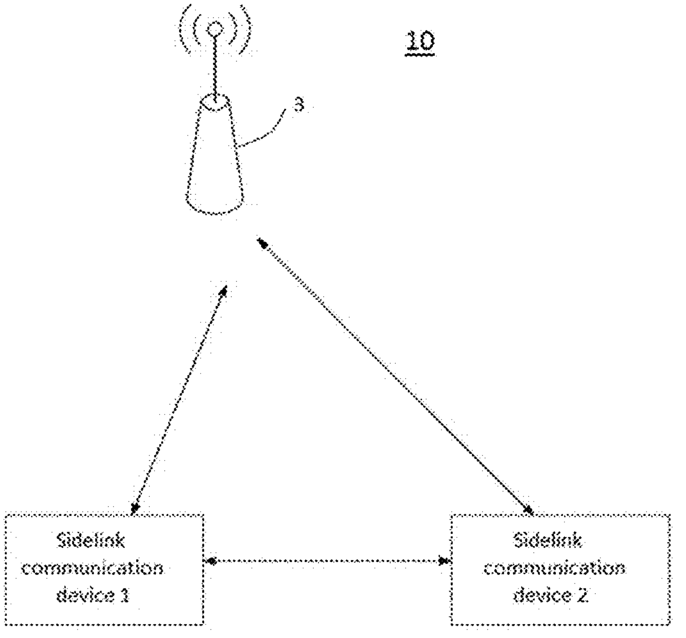

FIG. 1 perform, in a resource selection process triggered by a periodic sidelink transmission, resource selection according to a second resource selection mode in a case that a transmission resource pool of the UE supports periodic resource reservation, the UE is configured to perform partial listening-based resource selection, and to-be-selected time-frequency resources do not meet a condition required by a first resource selection mode

Perform, in a resource selection process triggered by a periodic sidelink transmission, resource selection according to a second resource selection mode in a case that a transmission resource pool of the UE supports periodic resource reservation, the UE is configured to perform partial listening-based resource selection, and to-be-selected time-frequency resources do not meet a condition required by a first resource selection mode S3011, Select candidate time-frequency resources that meet a second listening condition and of which the quantity is not less than a second threshold from the to-be-selected time-frequency resources S3012, Perform random resource selection among the to-be-selected time-frequency resources

Perform, in a resource selection process triggered by a periodic sidelink transmission, resource selection according to a second resource selection mode in a case that a transmission resource pool of the UE supports periodic resource reservation, the UE is configured to perform partial listening-based resource selection, and to-be-selected time-frequency resources do not meet a condition required by a first resource selection mode

S401

Indicate to a MAC layer or a higher layer through a physical layer that the resource selection is performed according to the second resource selection mode in the resource selection process

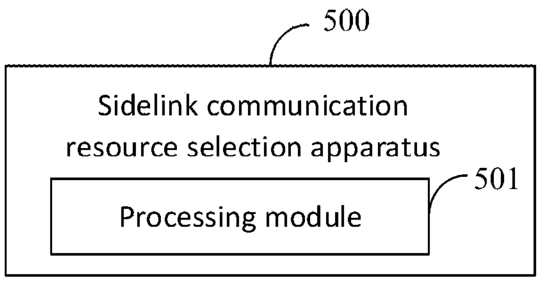

FIG. 5

SIDELINK COMMUNICATION RESOURCE SELECTION METHOD AND APPARATUS

CROSS-REFERENCE TO RELATED APPLICATION

The present application is a U.S. National Stage Application of International Application No. PCT/CN2021/138474, filed on Dec. 15, 2021, the contents of all of which are incorporated herein by reference in their entireties for all purposes.

BACKGROUND OF THE INVENTION

In sidelink (SL) communications, a user equipment (UE) is supported to adopt resource reservation and channel listening-based resource selection methods. Because of the large amount of power consumed during the UE continuously performs channel listening, a concept of "partial listening" has been introduced to save power.

SUMMARY OF THE INVENTION

The present disclosure relates to the field of mobile communications, and in particular, to a sidelink communication resource selection method and apparatus.

An embodiment of a first aspect of the present disclosure provides a sidelink communication resource selection method. The sidelink communication resource selection method is performed by a user equipment (UE) at a transmitting end and includes: performing, in a resource selection process triggered by a periodic sidelink transmission, resource selection according to a second resource selection mode in a case that a transmission resource pool of the UE supports periodic resource reservation, the UE is configured to perform partial listening-based resource selection, and to-be-selected time-frequency resources do not meet a condition required by a first resource selection mode. The first resource selection mode is used for selecting a resource for a sidelink transmission in which periodic resource reservation is performed. The second resource selection mode is used for selecting a resource for a sidelink transmission in which periodic resource reservation is not performed.

An embodiment of a second aspect of the present disclosure provides a sidelink communication resource selection apparatus, including: a processing module (processor), configured to perform, in a resource selection process triggered by a periodic sidelink transmission, resource selection according to a second resource selection mode in a case that a transmission resource pool of a UE supports periodic resource reservation, the UE is configured to perform partial listening-based resource selection, and to-be-selected time-frequency resources do not meet a condition required by a first resource selection mode. The first resource selection mode is used for selecting a resource for a sidelink transmission in which periodic resource reservation is performed. The second resource selection mode is used for selecting a resource for a sidelink transmission in which periodic resource reservation is not performed.

An embodiment of a third aspect of the present disclosure provides a communication device, including: a transceiver; a memory; and a processor, connected to the transceiver and the memory respectively, and configured to control transmission and reception of wireless signals of the transceiver by executing computer executable instructions on the memory, and implement the sidelink communication resource selection method according to the embodiment of the first aspect.

An embodiment of a fourth aspect of the present disclosure provides a non-transitory computer readable storage medium, storing computer executable instructions which, when executed by a processor, cause the processor to implement the sidelink communication resource selection method according to the embodiment of the first aspect.

BRIEF DESCRIPTION OF DRAWINGS

The above and/or additional aspects and advantages of the present disclosure will become apparent and readily understood from the following description of the embodiments with reference to the accompanying drawings.

FIG. 1 is a schematic architectural diagram of a communication system according to an embodiment of the present disclosure.

FIG. 2 is a schematic flowchart of a sidelink communication resource selection method according to an embodiment of the present disclosure.

FIG. 3 is a schematic flowchart of a sidelink communication resource selection method according to an embodiment of the present disclosure.

FIG. 4 is a schematic flowchart of a sidelink communication resource selection method according to an embodiment of the present disclosure.

FIG. 5 is a block diagram of a sidelink communication resource selection apparatus according to an embodiment of the present disclosure.

DETAILED DESCRIPTION OF THE INVENTION

Figure 6:
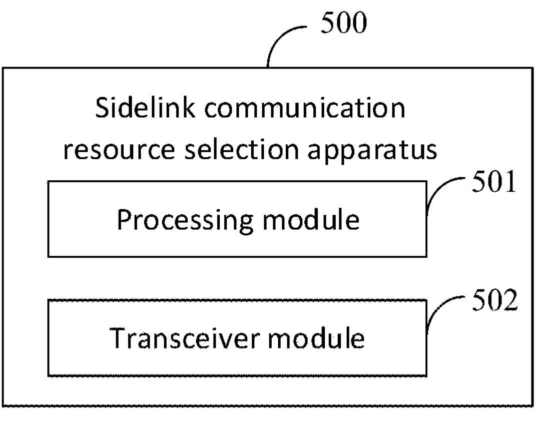
FIG. 6 is a block diagram of a sidelink communication resource selection apparatus according to an embodiment of the present disclosure.

Embodiments of the present disclosure will be described in detail, and examples of the embodiments are shown in the accompanying drawings. The same or similar reference numerals throughout indicate the same or similar elements or elements having the same or similar functions. The embodiments described with reference to the accompanying drawings are exemplary and intend to explain the present disclosure, and are not construed as a limitation of the present disclosure.

In order to better understand the sidelink communication resource selection method and apparatus disclosed in the embodiments of the present disclosure, a communication system applicable to the embodiments of the present disclosure is first described.

Referring to FIG. 1, in a scenario of sidelink communication between sidelink communication devices, a network device 3 configures various transmission parameters for data transmission for a sidelink communication device 1 in a wireless communication system 10. The sidelink communication device 1 serves as a data transmitter, a sidelink communication device 2 serves as a data receiver, and the two communicate directly. A link for communication between a network device 3 and any of the sidelink communication devices is uplink and downlink. A link between the sidelink communication devices is sidelink.

It may be understood that a wireless communication system 10 shown in FIG. 1 is merely a schematic illustration. The wireless communication system 10 may further include other network devices, for example, a core network device, a wireless relay device, and a wireless backhaul device, which are not shown in FIG. 1. The quantities of the network devices and terminals (for example sidelink communication devices) included in the wireless communication system 10 are not limited in the embodiments of the present disclosure.

It may be further understood that the wireless communication system 10 in the embodiment of the present disclosure is a network that provides a wireless communication function. The wireless communication system may adopt different communication technologies, for example, code division multiple access (CDMA), wideband code division multiple access (WCDMA), time division multiple access (TDMA), frequency division multiple access (FDMA), orthogonal frequency-division multiple access (OFDMA), single carrier FDMA (SC-FDMA), and carrier sense multiple access with collision avoidance. According to factors such as capacity, rate, and delay of different networks, the network may be classified into a 2G (generation) network, a 3G network, a 4G network, or a future evolution network, such as a 5G network. The 5G network may also be referred to as a New Radio (NR) network. For ease of description, a wireless communication network is sometimes referred to as a network in the present disclosure.

Further, the network device 3 involved in the present disclosure may also be referred to as a radio access network device. The radio access network device may be a base station, an evolved node B (eNB), a home node B, an access point (AP) in a wireless fidelity (WIFI) system, a wireless relay node, a wireless backhaul node, a transmission point (TP), or a transmission and reception point (TRP), or a gNB in an NR system, or a component or part of a device that constitutes a base station. In a case that the wireless communication system 10 is a vehicle-to-everything (V2X) communication system, the network device 3 may also be an in-vehicle device. It is understood that a specific technology and a specific device form adopted by the network device are not limited in the embodiments of the present disclosure.

Further, a terminal involved in the present disclosure may also be referred to as terminal equipment, a user equipment (UE), a mobile station (MS), or a mobile terminal (MT), and is a device that provides voice and/or data connectivity to a user. For example, the terminal may be a handheld device, an in-vehicle device, etc., with a wireless connection function. Some examples of the terminal include a smart mobile phone, a pocket personal computer (PPC), a palm computer, a personal digital assistant (PDA), a notebook computer, a tablet computer, a wearable device, or an in-vehicle device, etc. In addition, in a case that the wireless communication system is a vehicle-to-everything (V2X) communication system, the terminal may also be an in-vehicle device. It is to be understood that a specific technology and a specific device form adopted by the terminal are not limited in the embodiments of the present disclosure.

In the present disclosure, a communication scenario for sidelink communication between sidelink communication devices may also be a device to device (D2D) communication scenario. The sidelink communication devices for sidelink communication in the embodiments of the present disclosure may include various handheld devices, in-vehicle devices, wearable devices, and computing devices with a wireless communication function, or other processing devices connected to a wireless modem, and various forms of user equipments (UEs), mobile stations (MSs), terminals, terminal equipment, etc. For ease of description, the sidelink communication device being a terminal is taken as an example for illustration below in the embodiments of the present disclosure.

It may be understood that the communication system described in the embodiments of the present disclosure is to illustrate the technical solutions of the embodiments of the present disclosure more clearly, and does not constitute a limitation on the technical solutions provided in the embodiments of the present disclosure. A person of ordinary skill in the art can learn that, with the evolution of system architecture and the emergence of new service scenarios, the technical solutions provided in the embodiments of the present disclosure are also applicable to similar technical problems.

Vehicle to Everything (V2X) is a key technology of the future intelligent transportation system, and mainly studies a vehicle data transmission solution based on the Third Generation Partnership Project (3GPP) communication protocol. V2X communication includes vehicle to vehicle (V2V) communication, vehicle to infrastructure (V2I) communication, and vehicle to people (V2P) communication. V2X applications will improve driving safety, reduce congestion and vehicle energy consumption, increase traffic efficiency, etc. Using the existing cellular communication technology to support V2X communication can effectively reduce equipment overhead by using the existing base station deployment, and is more conducive to providing services with QoS guarantee to meet the requirements of V2X services. Therefore, support of a cellular network for V2X communication, namely, C-V2X (cellular based V2X), is provided in LTE Release 14/15. In C-V2X, communication between an in-vehicle device and other devices may be relayed through a base station and a core network, that is, communication (UL/DL communication) is performed by using a communication link between a UE and a base station in an original cellular network; alternatively, communication (sidelink communication) is performed through sidelink between devices. Compared with UL/DL communication, sidelink communication has the characteristics such as short delay and low overhead, and is very suitable for direct communication between an in-vehicle device and other peripherals in close proximity.

With the development of 5G mobile communication technology, a 5G NR (New Radio) technology is used in 3GPP Release 16 to support new V2X communication services and scenarios, for example, vehicles platooning, extended sensors, advanced driving, and remote driving. In general, 5G V2X sidelink can provide higher communication rate, shorter communication delay, and more reliable communication quality.

In sidelink communication, a UE is supported to adopt resource reservation and channel listening-based resource selection methods. Because of the large amount of power consumed during the UE continuously performs channel listening, a concept of "partial listening" has been introduced to save power.

Partial listening-based resource selection may include the following cases.

Case 1: Partial listening-based resource selection triggered by a periodic sidelink transmission is performed in a mode 2 resource pool that supports periodic resource reservation.

Case 2: Partial listening-based resource selection triggered by an aperiodic sidelink transmission is performed in a mode 2 resource pool that supports periodic resource reservation.

Case 3: Partial listening-based resource selection triggered by an aperiodic sidelink transmission is performed in a mode 2 resource pool that does not support periodic resource reservation.

For performing the partial listening-based resource selection, a specific partial listening condition needs to be met, and conditions that need to be met for partial listening based on different cases may be different. Because it is relatively easy to predict the arrival of periodic data, generally, partial listening conditions that need to be met in case 2 and case 3 are more relaxed than a partial listening condition that needs to be met in case 1. As understood by one of ordinary skill in the art, relaxed as used throughout means that the partial listening conditions are easier to be met than currently known methods or a specific case.

In LTE (Long Term Evolution) V2X (Vehicle to Everything), periodic resource reservation is merely supported. Therefore, in a case that the UE is configured to perform partial listening-based resource selection but cannot provide sufficient channel listening results to meet the partial listening conditions, the UE cannot perform partial listening-based resource selection, but can merely perform random resource selection. The random resource selection can merely avoid transmission collisions by randomization, and its performance is inferior to the performance of the partial listening-based resource selection.

In NR (New Radio) V2X, both periodic resource reservation and aperiodic resource reservation are supported. In this case, it is no longer appropriate to still adopt a resource selection solution similar to the resource selection solution in LTE V2X.

In view of this, for NR V2X communication, the present disclosure provides a sidelink communication resource selection method and apparatus, so that the UE can perform partial listening-based aperiodic resource selection in a case that the UE cannot provide sufficient channel listening results in a partial listening-based resource selection process triggered by a periodic sidelink transmission, so as to improve the data transmission performance.

The sidelink communication resource selection method and apparatus according to the present disclosure will be described in detail with reference to the accompanying drawings.

FIG. 2 is a schematic flowchart of a sidelink communication resource selection method according to an embodiment of the present disclosure. As shown in FIG. 2, the sidelink communication resource selection method may be performed by a UE at a transmitting end and includes step S201.

Step S201 includes performing, in a resource selection process triggered by a periodic sidelink transmission, resource selection according to a second resource selection mode in a case that a transmission resource pool of the UE supports periodic resource reservation, the UE is configured to perform partial listening-based resource selection, and to-be-selected time-frequency resources do not meet a condition required by a first resource selection mode.

The first resource selection mode is used for selecting a resource for a sidelink transmission in which periodic resource reservation is performed. The second resource selection mode is used for selecting a resource for a sidelink transmission in which periodic resource reservation is not performed.

The UE may perform resource selection according to different resource selection modes. For example, the UE may perform resource selection according to the first resource selection mode, or may perform resource selection according to the second resource selection mode. In the present disclosure, the "first resource selection mode" is used for selecting a resource for a sidelink transmission in which periodic resource reservation is performed, that is, periodic resource reservation is performed in a sidelink transmission in which the resource selected according to the first resource selection mode is used. For simplicity, "resource selection according to the first resource selection mode" may also be referred to as "periodic resource selection". The "second resource selection mode" is used for selecting a resource for a sidelink transmission in which periodic resource reservation is not performed, that is, no periodic resource reservation is performed in a sidelink transmission in which the resource selected according to the second resource selection mode is used. For simplicity, "resource selection according to the second resource selection mode" may also be referred to as "aperiodic resource selection".

In addition, the "to-be-selected time-frequency resources" may refer to time-frequency resources in a resource selection window adopted by the UE when performing resource selection.

In the resource selection process triggered by the periodic sidelink transmission, usually, the UE is expected to be triggered to perform periodic resource selection in a case that the transmission resource pool of the UE supports periodic resource reservation. However, in a case that the UE is currently configured to perform the partial listening-based resource selection, whether the UE can perform the periodic resource selection depends on whether the to-be-selected time-frequency resources meet a specific partial listening condition. That is, in a case that the to-be-selected time-frequency resources do not meet the specific partial listening condition, the UE cannot perform the periodic resource selection. In this embodiment, the UE performs, in the resource selection process triggered by the periodic sidelink transmission, aperiodic resource selection in a case that the transmission resource pool of the UE supports the periodic resource reservation, the UE is configured to perform the partial listening-based resource selection, and the to-be-selected time-frequency resources do not meet the condition required by the first resource selection mode (that is, the to-be-selected time-frequency resources do not meet the specific partial listening condition that needs to be met by the periodic resource selection).

In some embodiments, in a case that the resource selection process is triggered, signaling at a media access control (MAC) layer or a higher layer indicates that a resource reservation period is greater than 0. The higher layer may be at least one of an RLC layer, a PDCP layer, an RRC layer, or an application layer.

In a case that resource selection is triggered, the MAC layer or the higher layer indicates a resource selection parameter to a physical layer for a resource selection operation. In a case that the indicated resource reservation period is not 0, periodic resource selection is triggered, that is, the UE is expected to perform periodic resource reservation whose period is not 0 in the sidelink transmission in which the selected resource is used. The periodic resource reservation means that the UE reserves time-frequency resources for a next period when performing sidelink transmission in a current period. For example, assuming that the resource reservation period is Ts, the UE reserves transmission resources for time t+Ts when performing sidelink transmission at time t. The value of the resource reservation period Ts is generally a finite set of values, such as 0, 100, 200, 300, 400, 500 milliseconds, etc. It is to be understood that Ts may be in units of a physical time unit such as milliseconds, seconds, slots, subframes, etc., or a logical time unit such as logical slots. For example, all time units that may be used for the sidelink transmission are numbered in chronological order, and are referred to as sidelink logical time units, and a logical time difference between two moments is the quantity of logical time units between the two.

In some embodiments, the condition required by the first resource selection mode includes: a quantity of candidate time-frequency resources that meet a first listening condition among the to-be-selected time-frequency resources exceeds a first threshold. The first listening condition includes the UE listening on a first listening resource set. The first listening resource set is determined according to a specific resource reservation period set and time-frequency positions of the candidate time-frequency resources.

The "candidate time-frequency resources" may refer to time-frequency resources selected by the UE for the sidelink transmission when performing resource selection.

In order to perform partial listening-based periodic resource selection in the resource selection process triggered by the periodic sidelink transmission, the UE needs to be able to select candidate time-frequency resources of which the quantity is not less than the first threshold from the to-be-selected time-frequency resources, and the candidate time-frequency resources meet the first listening condition. That is, the UE listens on the first listening resource set, and the first listening resource set may be determined according to the specific resource reservation period set and the time-frequency positions of the candidate time-frequency resources. It is to be noted that the resources in the first listening resource set may be located before or after the resource selection is triggered. In an example, the first listening resource set may be determined according to a specific resource reservation period set (pre-configured or) configured by a resource pool used in a sidelink transmission, and the time-frequency positions of the candidate time-frequency resources. The specific resource reservation period set may be a subset of all resource reservation period sets supported by the resource pool.

For example, during performing partial listening-based periodic resource selection, the UE needs to select Y time units from a resource selection window, where $Y>=Y_{min}$. For the selected time unit y, the UE needs to perform channel listening in a time unit set $\{y-k*P_{reserve}\}$, where k is a positive integer, $P_{reserve}$ is any period in the specific resource reservation period set, and k is the smallest positive integer making $y-k*P_{reserve}$ less than y0, where y0 is the earliest time unit in the Y time units, so that the UE needs to perform channel listening on the nearest time unit before y0 and at an interval of an integer multiple of $P_{reserve}$ from the time unit y. Alternatively, for the selected time unit y, the UE needs to perform channel listening in a time unit set $\{y-P_{reserve}\}$, where $P_{reserve}$ may be several periods in the specific resource reservation period set, for example, $P_{reserve}$ may be 100, 200, 300, 400, 500, 600, 700, 800, 900, and 1000, so that the UE needs to perform channel listening on a time unit y-100, a time unit y-200, a time unit y-300, a time unit y-400, a time unit y-500, a time unit y-600, a time unit y-700, a time unit y-800, a time unit y-900, and a time unit y-1000.

On the contrary, in a case that the UE cannot select, from the to-be-selected time-frequency resources, the candidate time-frequency resources that meet the first listening condition and of which the quantity is not less than the first threshold, the UE cannot select the candidate time-frequency resources by performing the partial listening-based periodic resource selection. Therefore, in this embodiment, in the resource selection process triggered by the periodic sidelink transmission, the UE performs partial listening-based aperiodic resource selection, in a case that the transmission resource pool of the UE supports periodic resource reservation and the UE is configured to perform partial listening-based resource selection, but the to-be-selected time-frequency resources do not meet the condition required by the first resource selection mode, that is, the quantity of candidate time-frequency resources that meet the first listening condition among the to-be-selected time-frequency resources (for example, the time-frequency resources in the resource selection window) does not exceed the first threshold.

Because the UE does not need to perform periodic resource reservation in the sidelink transmission on the selected resource when performing partial listening-based aperiodic resource selection, a partial listening condition that needs to be met by the partial listening-based aperiodic resource selection is more relaxed than a partial listening condition that needs to be met by the partial listening-based periodic resource selection.

In some embodiments, the first threshold is preconfigured or determined according to a threshold carried in downlink signaling received from a network device.

The first threshold may be preset, for example, set according to protocol stipulations. Alternatively, it may be that the downlink signaling from the network device is received, and the threshold carried in the downlink signaling is determined as the first threshold.

According to the sidelink communication resource selection method in the embodiments of the present disclosure, in a resource selection process triggered by a periodic sidelink transmission, a UE at a transmitting end performs resource selection according to a second resource selection mode in a case that a transmission resource pool of the UE supports periodic resource reservation, the UE is configured to perform partial listening-based resource selection, and to-be-selected time-frequency resources do not meet a condition required by a first resource selection mode, where the first resource selection mode is used for selecting a resource for a sidelink transmission in which periodic resource reservation is performed, and the second resource selection mode is used for selecting a resource for a sidelink transmission in which periodic resource reservation is not performed. In this way, in a case that the UE cannot provide sufficient channel listening results in a partial listening-based resource selection process triggered by a periodic sidelink transmission, the UE can perform resource selection according to a resource selection mode used for selecting a resource for a sidelink transmission in which periodic resource reservation is not performed, so as to improve data transmission performance.

FIG. 3 is a schematic flowchart of a sidelink communication resource selection method according to an embodiment of the present disclosure. As shown in FIG. 3, the sidelink communication resource selection method may be performed by a UE at a transmitting end and includes steps S301, S3011 and S3012.

Step S301 includes performing, in a resource selection process triggered by a periodic sidelink transmission, resource selection according to a second resource selection mode in a case that a transmission resource pool of the UE supports periodic resource reservation, the UE is configured to perform partial listening-based resource selection, and to-be-selected time-frequency resources do not meet a condition required by a first resource selection mode.

The first resource selection mode is used for selecting a resource for a sidelink transmission in which periodic resource reservation is performed. The second resource selection mode is used for selecting a resource for a sidelink transmission in which periodic resource reservation is not performed.

In some embodiments, in a case that the resource selection process is triggered, signaling at an MAC layer or a higher layer indicates that a resource reservation period is greater than 0. The higher layer may be at least one of an RLC layer, a PDCP layer, an RRC layer, or an application layer.

In some embodiments, the condition required by the first resource selection mode includes that: a quantity of candidate time-frequency resources that meet a first listening condition amone the to-be-selected time-frequency resources exceeds a first threshold. The first listening condition includes the UE listening on a first listening resource set. The first listening resource set is determined according to a specific resource reservation period set and time-frequency positions of the candidate time-frequency resources.

In some embodiments, the first threshold is preconfigured or determined according to a threshold carried in downlink signaling received from a network device.

For a detailed description of step S301 and related details thereof, reference may be made to the description of step S201 and related details thereof, which will not be repeated.

In addition, in some embodiments and as shown in FIG. 3, step S301 may include any one of steps S3011 and S3012.

Step S3011 includes selecting candidate time-frequency resources that meet a second listening condition and of which the quantity is not less than a second threshold from the to-be-selected time-frequency resources.

The second listening condition includes the UE listening on a second listening resource set. The second listening resource set is determined according to a specific resource reservation period set and time-frequency positions of the candidate time-frequency resources, or determined merely according to the time-frequency positions of the candidate time-frequency resources.

During performing the partial listening-based aperiodic resource selection, the UE may select candidate time-frequency resources of which the quantity is not less than a second threshold from the to-be-selected time-frequency resources, and the candidate time-frequency resources meet the second listening condition. That is, the UE listens on a second listening resource set, where the second listening resource set may be determined according to a specific resource reservation period set and time-frequency positions of the candidate time-frequency resources, or may be determined merely according to the time-frequency positions of the candidate time-frequency resources. In an example, the second listening resource set may be determined according to a specific resource reservation period set configured by a resource pool used in a sidelink transmission and according to the time-frequency positions of the candidate time-frequency resources, where the specific resource reservation period set may be a subset of all resource reservation period sets supported by the resource pool. Alternatively, the second listening resource set may be determined merely according to the time-frequency positions of the candidate time-frequency resources. Therefore, a partial listening condition that needs to be met by the partial listening-based aperiodic resource selection is more relaxed than a partial listening condition that needs to be met by the partial listening-based periodic resource selection, because the listening resource set corresponding to the candidate time-frequency resources may be determined merely according to the time-frequency positions of the candidate time-frequency resources. For example, assuming that, for a resource, listening on a listening resource set determined according to a time-frequency position of the resource and a specific resource reservation period set cannot be met, but listening on a listening resource set determined merely according to the time-frequency position of the resource can be met, the resource may still be determined as a candidate resource.

For example, during performing the partial listening-based aperiodic resource selection, the UE may select Y' time units from a resource selection window, where $Y' \geq Y'_{min}$. For the selected time unit y', the UE needs to perform channel listening in a time unit set $\{y'-k'*P'_{reserve}\}$, where k' is a positive integer, $P'_{reserve}$ is any period in the specific resource reservation period set, and k' is the smallest positive integer making $y'-k'*P'_{reserve}$ less than y0', where y0' is the earliest time unit in the Y' time units, so that the UE needs to perform channel listening on the nearest time unit before y0' and at an interval of an integer multiple of $P'_{reserve}$ from the time unit y'. Alternatively, for the selected time unit y', the UE needs to perform channel listening in a time unit set $\{y'-P'_{reserve}\}$, where $P'_{reserve}$ may be several periods in the specific resource reservation period set, for example, $P'_{reserve}$ may be 100, 200, 300, 400, 500, 600, 700, 800, 900, and 1000, so that the UE needs to perform channel listening on a time unit y'-100, a time unit y'-200, a time unit y'-300, a time unit y'-400, a time unit y'-500, a time unit y'-600, a time unit y'-700, a time unit y'-800, a time unit y'-900, and a time unit y'-1000. In these two examples, the time unit set is determined according to the specific resource reservation period set and time-frequency positions of the selected time units.

For another example, during performing the partial listening-based aperiodic resource selection, the UE may select Y' time units from a resource selection window, where $Y' \geq Y'_{min}$. For any selected time unit y', the UE needs to perform channel listening in a time unit set [y'-M, y0], where M may be 1-31 slots. In this example, the time unit set is determined merely according to time-frequency positions of the selected time units.

In some embodiments, the second threshold is preconfigured or determined according to a threshold carried in a downlink signaling received from the network device.

The second threshold may be preset, for example, set according to protocol stipulations. Alternatively, it may be that the downlink signaling from the network device is received, and the threshold carried in the downlink signaling is determined as the second threshold.

Step S3012 includes performing random resource selection among the to-be-selected time-frequency resources.

During performing the partial listening-based aperiodic resource selection, the UE may perform random resource selection to select candidate time-frequency resources from the to-be-selected time-frequency resources. That is, the UE may randomly select candidate time-frequency resources from the to-be-selected time-frequency resources without considering a channel listening result.

According to the sidelink communication resource selection method in the embodiments of the present disclosure, in a resource selection process triggered by a periodic sidelink transmission, a UE at a transmitting end performs resource selection according to a second resource selection mode in a case that a transmission resource pool of the UE supports periodic resource reservation, the UE is configured to perform the partial listening-based resource selection, and to-be-selected time-frequency resources do not meet a condition required by a first resource selection mode. The first resource selection mode is used for selecting a resource for a sidelink transmission in which periodic resource reservation is performed. The second resource selection mode is used for selecting a resource for a sidelink transmission in which periodic resource reservation is not performed. In this way, in a case that the UE cannot provide sufficient channel listening results in a partial listening-based resource selection process triggered by a periodic sidelink transmission, the UE can perform resource selection according to a resource selection mode used for selecting a resource for a sidelink transmission in which periodic resource reservation is not performed, so as to improve data transmission performance.

FIG. 4 is a schematic flowchart of a sidelink communication resource selection method according to an embodiment of the present disclosure. As shown in FIG. 4, the sidelink communication resource selection method may be performed by a UE at a transmitting end and includes steps S401 and S402.

Step S401 includes performing, in a resource selection process triggered by a periodic sidelink transmission, resource selection according to a second resource selection mode in a case that a transmission resource pool of the UE supports periodic resource reservation, the UE is configured to perform partial listening-based resource selection, and to-be-selected time-frequency resources do not meet a condition required by a first resource selection mode.

The first resource selection mode is used for selecting a resource for a sidelink transmission in which periodic resource reservation is performed. The second resource selection mode is used for selecting a resource for a sidelink transmission in which periodic resource reservation is not performed.

In some embodiments, in a case that the resource selection process is triggered, signaling at an MAC layer or a higher layer indicates that a resource reservation period is greater than 0. The higher layer may be at least one of an RLC layer, a PDCP layer, an RRC layer, or an application layer.

In some embodiments, the condition required by the first resource selection mode includes that: a quantity of candidate time-frequency resources that meet a first listening condition among the to-be-selected time-frequency resources exceeds a first threshold. The first listening condition includes the UE listening on a first listening resource set. The first listening resource set is determined according to a specific resource reservation period set and time-frequency positions of the candidate time-frequency resources.

In some embodiments, the first threshold is preconfigured or determined according to a threshold carried in downlink signaling received from a network device.

For a detailed description of step S401 and related details thereof, reference may be made to the description of steps S201 and S301 and related details thereof, which will not be repeated.

Step S402 includes indicating to the MAC layer or the higher layer through a physical layer that resource selection is performed according to the second resource selection mode in the resource selection process. The higher layer may be at least one of an RLC layer, a PDCP layer, an RRC layer, or an application layer.

As mentioned herein, in the resource selection process triggered by the periodic sidelink transmission, the UE is expected to be triggered to perform periodic resource selection usually in a case that the transmission resource pool of the UE supports periodic resource reservation. However, in a case that the UE performs aperiodic resource selection in the resource selection process triggered by the periodic sidelink transmission, that is, the UE does not perform periodic resource selection as expected, the UE needs to indicate the MAC layer or the higher layer through the physical layer that aperiodic resource selection is performed in the resource selection process.

In an example, after the UE selects a candidate time-frequency resource set by performing partial listening-based aperiodic resource selection, the physical layer needs to report the candidate time-frequency resource set to the MAC layer or the higher layer, and indicate, at the same time, that the candidate time-frequency resource set is selected by the UE performing resource selection according to the second resource selection mode.

According to the sidelink communication resource selection method in the embodiments of the present disclosure, in a resource selection process triggered by a periodic sidelink transmission, a UE at a transmitting end performs resource selection according to a second resource selection mode in a case that a transmission resource pool of the UE supports periodic resource reservation, the UE is configured to perform partial listening-based resource selection, and to-be-selected time-frequency resources do not meet a condition required by a first resource selection mode. The first resource selection mode is used for selecting a resource for a sidelink transmission in which periodic resource reservation is performed. The second resource selection mode is used for selecting a resource for a sidelink transmission in which periodic resource reservation is not performed. Moreover, while reporting a candidate time-frequency resource set, it is indicated at the same time that the candidate time-frequency resource set is selected according to the second resource selection mode, so that an MAC layer or a higher layer can learn that the candidate time-frequency resource set is selected according to the second resource selection mode rather than the first resource selection mode.

In the herein-mentioned embodiments according to the present disclosure, the method according to the embodiments of the present disclosure is introduced from the perspective of the UE. In order to implement various functions in the method provided in the embodiments of the present disclosure, the UE may include a hardware structure and/or a software module to implement the included various functions in a form of the hardware structure, the software module, or the hardware structure plus the software module. One of the various functions may be performed in a manner of the hardware structure, the software module, or the hardware structure plus the software module.

The present disclosure further provides a sidelink communication resource selection apparatus corresponding to the sidelink communication resource selection method provided in the included embodiments. Because the sidelink communication resource selection apparatus provided in the embodiments of the present disclosure corresponds to the sidelink communication resource selection method provided in the included embodiments, the implementations of the sidelink communication resource selection method are also applicable to the sidelink communication resource selection apparatus provided in the embodiments, and are not described in detail in the embodiments.

FIG. 5 is a schematic structural diagram of a sidelink communication resource selection apparatus 500 according to an embodiment of the present disclosure. As shown in FIG. 5, the sidelink communication resource selection apparatus 500 may include a processing module 501.

The processing module 501 is configured to perform, in a resource selection process triggered by a periodic sidelink transmission, resource selection according to a second resource selection mode in a case that a transmission resource pool of a UE supports periodic resource reservation, the UE is configured to perform partial listening-based resource selection, and to-be-selected time-frequency resources do not meet a condition required by a first resource selection mode. The first resource selection mode is used for selecting a resource for a sidelink transmission in which periodic resource reservation is performed. The second resource selection mode is used for selecting a resource for a sidelink transmission in which periodic resource reservation is not performed. The processing module 501 may be any type of processor or device capable of performing the functions.

According to the sidelink communication resource selection apparatus 500 in the embodiments of the present disclosure, in a resource selection process triggered by a periodic sidelink transmission, a UE at a transmitting end performs resource selection according to a second resource selection mode in a case that a transmission resource pool of the UE supports periodic resource reservation, the UE is configured to perform partial listening-based resource selection, and to-be-selected time-frequency resources do not meet a condition required by a first resource selection mode. The first resource selection mode is used for selecting a resource for a sidelink transmission in which periodic resource reservation is performed. The second resource selection mode is used for selecting a resource for a sidelink transmission in which periodic resource reservation is not performed. In this way, in a case that the UE cannot provide sufficient channel listening results in a partial listening-based resource selection process triggered by a periodic sidelink transmission, the UE can perform resource selection according to a resource selection mode used for selecting a resource for a sidelink transmission in which periodic resource reservation is not performed, so as to improve data transmission performance.

In some embodiments, in a case that the resource selection process is triggered, a media access control (MAC) layer or a higher layer indicates that a resource reservation period is not 0. The higher layer includes at least one of an RLC layer, a PDCP layer, an RRC layer, or an application layer. The resource reservation period indicates a time interval between resources-to-be-reserved in a case that the UE performs periodic resource reservation.

In some embodiments, the condition required by the first resource selection mode includes that: a quantity of candidate time-frequency resources that meet a first listening condition among the to-be-selected time-frequency resources exceeds a first threshold. The first listening condition includes the UE listening on a first listening resource set. The first listening resource set is determined according to a specific resource reservation period set and time-frequency positions of the candidate time-frequency resources.

In some embodiments, the processing module 501 is configured to select candidate time-frequency resources that meet a second listening condition and of which the quantity is not less than a second threshold from the to-be-selected time-frequency resources. The second listening condition includes the UE listening on a second listening resource set. The second listening resource set is determined according to a specific resource reservation period set and time-frequency positions of the candidate time-frequency resources, or determined merely according to the time-frequency positions of the candidate time-frequency resources.

In some embodiments, the processing module 501 is configured to perform random resource selection among the to-be-selected time-frequency resources.

In some embodiments, the first threshold is preconfigured or determined according to a threshold carried in downlink signaling received from a network device. The second threshold is preconfigured or determined according to a threshold carried in downlink signaling received from a network device.

In some embodiments, as shown in FIG. 6, the sidelink communication resource selection apparatus 500 further includes: a transceiver module 502, configured to indicate to a MAC layer or a higher layer through a physical layer that resource selection is performed according to the second resource selection mode in the resource selection process. The higher layer includes at least one of an RLC layer, a PDCP layer, an RRC layer, or an application layer. The transceiver module 502 may be any type of transmitting/receiving device capable of performing the functions.

Figure 7:
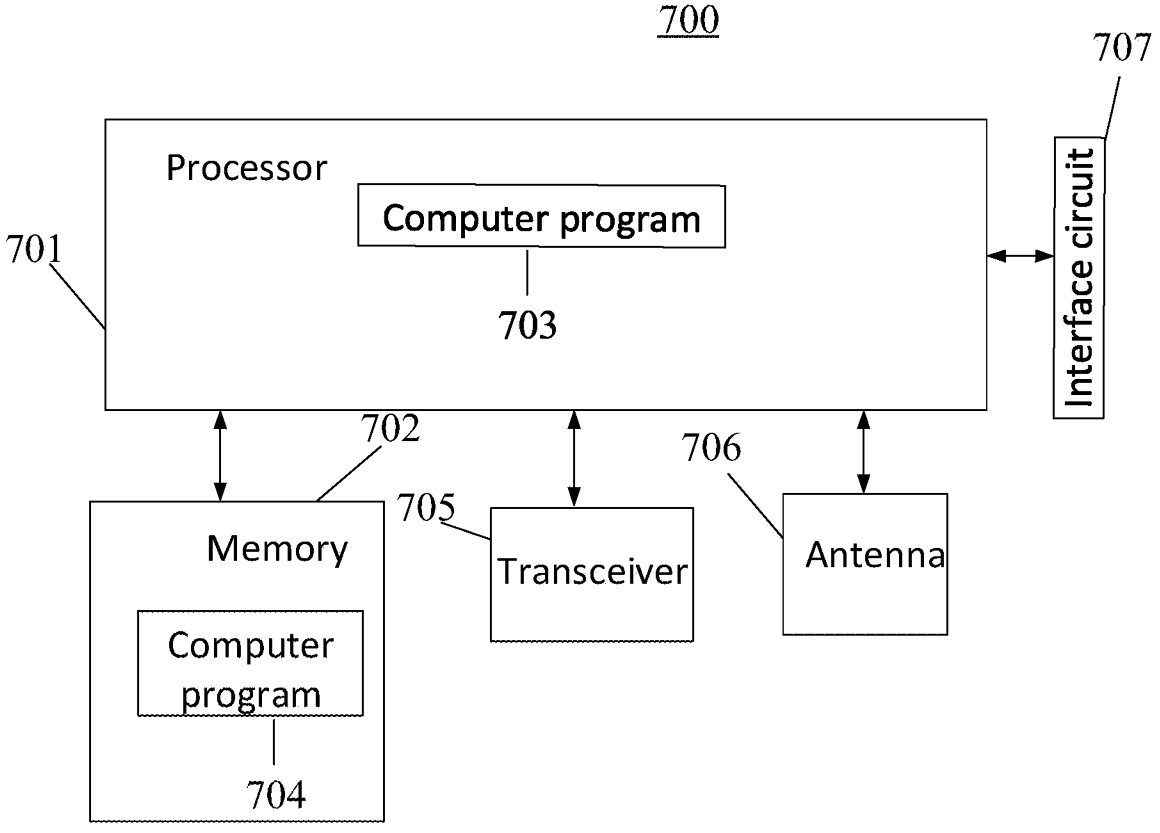
FIG. 7 is a schematic structural diagram of a communication apparatus according to an embodiment of the present disclosure.

Referring to FIG. 7, FIG. 7 is a schematic structural diagram of a communication apparatus 700 according to an embodiment of the present disclosure. The communication apparatus 700 may be a UE, or a chip, a system on a chip, or a processor, etc., that supports a network device to implement the included methods, or a chip, a system on a chip, or a processor, etc., that supports the UE to implement the included methods. The communication apparatus 700 may be configured to implement any of the methods described in the included method embodiments. For details, reference may be made to the description in the included method embodiments. The communication apparatus 700 according to FIG. 7 includes a processor 701, a memory 702, a computer program 703, a computer program 704, a transceiver 705, an antenna 706 and an interface circuit 707. The processor 701, the memory 702, the transceiver 705, the antenna 706 and the interface circuit 707 are all in communicatively connected by any of a wired or wireless connection(s).

The communication apparatus 700 may include one or more processors 701. The processor 701 may be a general-purpose processor or a special-purpose processor, etc. For example, the processor 701 may be a baseband processor or a central processing unit. The baseband processor may be configured to process a communication protocol and communication data. The central processing unit may be configured to control communication apparatuses (for example, a base station, a baseband chip, terminal equipment, a terminal equipment chip, a DU or a CU, etc.) to execute a computer program and process data of the computer program.

The communication apparatus 700 further includes one or more memories 702 in which a computer program 704 may be stored. The processor 701 executes the computer program 704 to cause the communication apparatus 700 to perform the method described in the included method embodiments. In an example, data may also be stored in the memory 702. The communication apparatus 700 and the memory 702 may be disposed separately or integrated.

The communication apparatus 700 further includes a transceiver 705 and an antenna 706. The transceiver 705 may be referred to as a transceiver unit, a transceiver, or a transceiver circuit, etc., for implementing receiving and transmission functions. The transceiver 705 may include a receiver and a transmitter. The receiver may be referred to as a receiver or a receiving circuit, for implementing a receiving function. The transmitter may be referred to as a transmitter or a transmission circuit, for implementing a transmission function.

The communication apparatus 700 further includes one or more interface circuits 707. The interface circuit 707 is configured to receive code instructions and transmit the code instructions to the processor 701. The processor 701 runs the code instructions to cause the communication apparatus 700 to perform the method described in the included method embodiments.

The communication apparatus 700 is a UE; the processor 701 is configured to perform steps S201 in FIG. 2, S301 in FIG. 3, including S3011 to S3012, and S401 in FIG. 4; and the transceiver 705 is configured to perform step S402 in FIG. 4.

In one implementation, the processor 701 may include a transceiver (not shown) configured to implement receiving and transmitting functions. For example, the transceiver may be a transceiver circuit, or an interface, or an interface circuit. The transceiver circuits, interfaces, or interface circuits configured to implement the receiving and transmitting functions may be separate or integrated. The transceiver circuit, interface, or interface circuit may be configured for code/data reading and writing. Alternatively, the transceiver circuit, interface, or interface circuit may be configured for signal transmission or delivery.

In one implementation, and as shown in FIG. 7, the processor 701 may have a computer program 703 stored therein. The computer program 703, when run on the processor 701, may cause the communication apparatus 700 to perform the method described in the included method embodiments. The computer program 703 may be solidified in the processor 701. In this case, the processor 701 may be implemented by hardware.

In one implementation, the communication apparatus 700 may include a circuit (not shown). The circuit may implement a transmission or receiving or communication function in the included method embodiments. The processor 701 and the transceiver 705 described in the present disclosure may be implemented in an integrated circuit (IC), an analog IC, a radio frequency integrated circuit (RFIC), a mixed-signal IC, an application specific integrated circuit (ASIC), a printed circuit board (PCB), an electronic device, etc. The processor 701 and the transceiver 705 may also be manufactured by using various IC process technologies, for example, a complementary metal oxide semiconductor (CMOS), an n-type metal oxide semiconductor (NMOS), a p-type metal oxide semiconductor (PMOS), a bipolar junction transistor (BJT), a bipolar CMOS (BiCMOS), SiGe, and GaAs.

The communication apparatus 700 described in the included embodiments may be a network device or a UE, but the scope of the communication apparatus described in the present disclosure is not limited to this. The structure of the communication apparatus 700 may not be limited by FIG. 7. The communication apparatus 700 may be an independent device or may be part of a larger device. For example, the communication apparatus 700 may be at least any of: (1) an independent integrated circuit (IC), a chip, or a system or subsystem on a chip; (2) a set having one or more ICs, where in an example, the IC set may also include a storage component configured to store data or a computer program; (3) an ASIC, such as a modem; (4) a module that may be embedded in another device; (5) a receiver, terminal equipment, intelligent terminal equipment, a cellular phone, a wireless device, a handset, a mobile unit, an in-vehicle device, a network device, a cloud device, an artificial intelligence device, etc.; or (6) others, etc.

Figure 8:
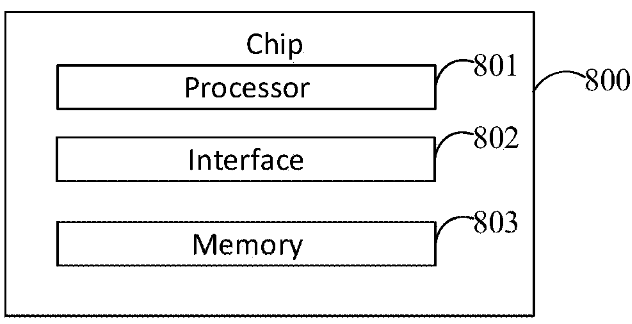
FIG. 8 is a schematic structural structure of a chip according to an embodiment of the present disclosure.

For a case in which the communication apparatus may be a chip or a system on a chip, reference may be made to a schematic structural diagram of a chip shown in FIG. 8. The chip 800 shown in FIG. 8 includes a processor 801, an interface 802, and a memory 803. One or more processors 801 and a plurality of interfaces 802 may be provided.

For a case in which the chip 800 is configured to implement the functions of the UE in the embodiments of the present disclosure, the processor 801 is configured to perform steps S201 in FIG. 2, S301 in FIG. 3, including S3011 to S3012, and S401 in FIG. 4; and the interface 802 is configured to perform step S402 in FIG. 4.

As shown in FIG. 8, the chip 800 includes a memory 803 that is configured to store a necessary computer program (not shown) and data.

A person skilled in the art may further understand that various illustrative logical blocks and steps that are listed in the embodiments of the present disclosure may be implemented by using electronic hardware, computer software, or a combination thereof. Whether the functions are implemented by using hardware or software depends on specific applications and a design requirement of the entire system. A person skilled in the art may use various methods to implement the described functions for each specific application, but it is not considered that the implementation goes beyond the protection scope of the embodiments of the present disclosure.

An embodiment of the present disclosure further provides a sidelink communication resource selection system. The system includes the communication apparatus 500 as a UE in the embodiments of FIG. 5 and FIG. 6. Alternatively, the system includes the communication apparatus 700 as a UE in the embodiment of FIG. 7.

The present disclosure further provides a non-transitory computer-readable storage medium, having instructions stored therein. The instructions, when executed by a computer, implement the functions of any one of the included method embodiments.

The present disclosure further provides a computer program product. The computer program product, when executed by a computer, implements the functions of any one of the included method embodiments.

All or some of the included embodiments may be implemented by using software, hardware, firmware, or any combination thereof. In a case that software is used for implementation, all or some of the embodiments may be implemented in a form of a computer program product. The computer program product includes one or more computer programs. When the computer programs are loaded and executed on a computer, all or some of the computer programs generate procedures or functions according to the embodiments of the present disclosure. The computer may be a general-purpose computer, a dedicated computer, a computer network, or another programmable device. The computer programs may be stored in a non-transitory computer-readable storage medium, or may be transmitted from a non-transitory computer-readable storage medium to another one. For example, the computer programs may be transmitted from a website, computer, server, or data center to another website, computer, server, or data center in a wired (for example, a coaxial cable, an optical fiber, or a digital subscriber line (DSL) or wireless (for example, infrared, radio, or microwave) manner. The non-transitory computer-readable storage medium may be any usable available medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), or a semiconductor medium (for example, a solid state disk (SSD)), etc.

It may be understood that the time unit involved in the embodiments of the present disclosure may be a physical time unit, or may be a logical time unit, for example, in units of seconds, milliseconds, microseconds, frames, subframes, slots, orthogonal frequency division multiplexing symbols, etc.

It may be understood that the time-frequency resources involved in the embodiments of the present disclosure may include at least one of time domain resources or frequency domain resources. Correspondingly, the time-frequency positions of the time-frequency resources represent time domain positions of the time domain resources and/or frequency domain positions of the frequency domain resources.

A person of ordinary skill in the art may understand that various reference numerals such as first and second involved in the present disclosure are merely for distinguishing for ease of description, but are not intended to limit the scope of the embodiments of the present disclosure, and also represent the sequential order.

"At least one" in the present disclosure may also be described as one or more, and "a plurality of" may be two, three, four or more, which is not limited in the present disclosure. In the embodiments of the present disclosure, for a technical feature, technical features in the technical feature are distinguished through "first", "second", "third", "A", "B", "C", "D", etc. There is no sequential order or size order between the technical features described by the "first", "second", "third", "A", "B", "C" and "D".

As used herein, the terms "non-transitory machine-readable medium" and "non-transitory computer-readable medium" refer to any computer program product, equipment, and/or device (for example, a magnetic disk, an optical disc, a memory, or a programmable logic device (PLD)) that provide machine instructions and/or data to a programmable processor, and include a machine-readable medium that receives a machine instruction as a machine-readable signal. The term "machine-readable signal" refers to any signal used to provide machine instructions and/or data to a programmable processor.

The systems and technologies described herein may be implemented in a computing system (for example, as a data server) that includes a back-end component, or a computing system (for example, an application server) that includes a middleware component, or a computing system (for example, a user computer with a graphical user interface or a web browser through which the user can interact with an implementations of the systems and the technologies described herein) that includes a front-end component, or a computing system that includes any combination of the back-end component, the middleware component, or the front-end component. The components of the system may be interconnected by digital data communication (for example, a communication network) in any form or medium. Examples of the communication network include: a local area network (LAN), a wide area network (WAN), and the Internet.

The computer system may include a client and a server. The client and the server are generally remote from each other, and generally interact with each other through a communication network. The relationship between the client and the server is generated by computer programs that run on corresponding computers and have a client-server relationship with each other.

It is to be understood that the various forms of processes shown and described herein may be used to reorder, add, or delete steps. For example, the various steps recorded in the present disclosure may be performed in parallel, sequentially, or in different orders, as long as the desired results of the technical solutions disclosed in the present disclosure may be implemented, which is not limited herein.

In addition, it is to be understood that the embodiments of the present disclosure may be implemented separately or implemented in combination with other embodiments if the solution permits.

A person of ordinary skill in the art may be aware that, units and algorithmic steps described in combination with the embodiments disclosed in the disclosure may be implemented by electronic hardware, or a combination of computer software and electronic hardware. Whether the functions are performed by hardware or software depends on the specific applications and design constraint conditions of the technical solutions. A person skilled in the art may use different methods to implement the described functions for each specific application, but it is not considered that the implementation goes beyond the scope of the present disclosure.

A person skilled in the art may clearly understand that for the convenience and concise of description, for the specific work process of the described system, apparatus, and unit, reference may be made to corresponding process in the included method embodiments, which will not be repeated here.

The included descriptions are merely implementations of the present disclosure, but the protection scope of the present disclosure is not limited thereto. Any variation or replacement readily figured out by a person skilled in the art within the technical scope disclosed in the present disclosure falls within the protection scope of the present disclosure. Therefore, the protection scope of the present disclosure needs to be subject to the protection scope of the claims.

The invention claimed is:

1. A sidelink communication resource selection method, performed by a user equipment (UE) at a transmitting end and comprising:

performing, in a resource selection process triggered by a periodic sidelink transmission, resource selection according to a second resource selection mode in a case that a transmission resource pool of the UE supports periodic resource reservation, the UE is configured to perform partial listening-based resource selection, and to-be-selected time-frequency resources do not meet a condition required by a first resource selection mode, wherein the first resource selection mode is used for selecting a resource for a sidelink transmission in which periodic resource reservation is performed, and wherein the second resource selection mode is used for selecting a resource for a sidelink transmission in which periodic resource reservation is not performed.

2. The sidelink communication resource selection method according to claim 1, wherein a media access control (MAC) layer or a higher layer indicates that a resource reservation period is not 0 in a case that the resource selection process is triggered, and the higher layer comprises at least one of a Radio Link Control (RLC) layer, a Packet Data Convergence Protocol (PDCP) layer, a Radio Resource Control (RRC) layer, or an application layer, and wherein the resource reservation period indicates a time interval between resources-to-be-reserved in a case that the UE performs the periodic resource reservation.

3. The sidelink communication resource selection method according to claim 1, wherein the condition required by the first resource selection mode comprises a quantity of candidate time-frequency resources that meet a first listening condition among the to-be-selected time-frequency resources exceeds a first threshold, wherein the first listening condition comprises the UE listening on a first listening resource set, and wherein the first listening resource set is determined according to a specific resource reservation period set and time-frequency positions of the candidate time-frequency resources that meet the first listening condition.

4. The sidelink communication resource selection method according to claim 1, wherein performing the resource selection according to the second resource selection mode comprises:

selecting, from the to-be-selected time-frequency resources, candidate time-frequency resources that meet a second listening condition and of which a quantity is not less than a second threshold, wherein the second listening condition comprises the UE listening on a second listening resource set, and wherein the second listening resource set is determined according to a specific resource reservation period set and time-frequency positions of the candidate time-frequency resources that meet the second listening condition, or is determined merely according to the time-frequency positions of the candidate time-frequency resources that meet the second listening condition.

5. The sidelink communication resource selection method according to claim 1, wherein performing the resource selection according to the second resource selection mode comprises:

performing random resource selection among the to-be-selected time-frequency resources.

6. The sidelink communication resource selection method according to claim 1, further comprising:

indicating to a media access control (MAC) layer or a higher layer through a physical layer that the resource selection is performed according to the second resource selection mode in the resource selection process, wherein the higher layer comprises at least one of a Radio Link Control (RLC) layer, a Packet Data Convergence Protocol (PDCP) layer, a Radio Resource Control (RRC) layer, or an application layer.

7. A communication device, comprising:

a transceiver;

a memory; and a processor communicatively connected to the transceiver and the memory, and the processor is configured to:

control transmission and reception of wireless signals of the transceiver by executing computer executable instructions on the memory; and perform, in a resource selection process triggered by a periodic sidelink transmission, resource selection according to a second resource selection mode in a case that a transmission resource pool of the processor supports periodic resource reservation, the processor is configured to perform partial listening-based resource selection, and to-be-selected time-frequency resources do not meet a condition required by a first resource selection mode, wherein the first resource selection mode is used for selecting a resource for a sidelink transmission in which periodic resource reservation is performed, and wherein the second resource selection mode is used for selecting a resource for a sidelink transmission in which periodic resource reservation is not performed.

8. The communication device according to claim 7, wherein a media access control (MAC) layer or a higher layer indicates that a resource reservation period is not 0 in a case that the resource selection process is triggered, and the higher layer comprises at least one of a Radio Link Control (RLC) layer, a Packet Data Convergence Protocol (PDCP) layer, a Radio Resource Control (RRC) layer, or an application layer, and wherein the resource reservation period indicates a time interval between resources-to-be-reserved in a case that the processor performs the periodic resource reservation.

9. The communication device according to claim 7, wherein the condition required by the first resource selection mode comprises a quantity of candidate time-frequency resources that meet a first listening condition among the to-be-selected time-frequency resources exceeds a first threshold, wherein the first listening condition comprises the processor listening on a first listening resource set, and wherein the first listening resource set is determined according to a specific resource reservation period set and time-frequency positions of the candidate time-frequency resources that meet the first listening condition.

10. The communication device according to claim 7, wherein the processor performing the resource selection according to the second resource selection mode is configured to:

select, from the to-be-selected time-frequency resources, candidate time-frequency resources that meet a second listening condition and of which a quantity is not less than a second threshold, wherein the second listening condition comprises the processor listening on a second listening resource set, and wherein the second listening resource set is determined according to a specific resource reservation period set and time-frequency positions of the candidate time-frequency resources that meet the second listening condition, or is determined according to the time-frequency positions of the candidate time-frequency resources that meet the second listening condition.

11. The communication device according to claim 7, wherein the processor performing the resource selection according to the second resource selection mode is configured to:

perform random resource selection among the to-be-selected time-frequency resources.

12. The communication device according to claim 7, wherein the processor is further configured to:

indicate to a media access control (MAC) layer or a higher layer through a physical layer that the resource selection is performed according to the second resource selection mode in the resource selection process, wherein the higher layer comprises at least one of a Radio Link Control (RLC) layer, a Packet Data Convergence Protocol (PDCP) layer, a Radio Resource Control (RRC) layer, or an application layer.

13. A non-transitory computer-readable storage medium, storing computer executable instructions which, when executed by a processor, cause the processor to:

perform, in a resource selection process triggered by a periodic sidelink transmission, resource selection according to a second resource selection mode in a case that a transmission resource pool of the processor supports periodic resource reservation, the processor is configured to perform partial listening-based resource selection, and to-be-selected time-frequency resources do not meet a condition required by a first resource selection mode;

wherein the first resource selection mode is used for selecting a resource for a sidelink transmission in which periodic resource reservation is performed, and the second resource selection mode is used for selecting a resource for a sidelink transmission in which periodic resource reservation is not performed.

14. The non-transitory computer-readable storage medium according to claim 13, wherein a media access control (MAC) layer or a higher layer indicates that a resource reservation period is not 0 in a case that the resource selection process is triggered, and the higher layer comprises at least one of a Radio Link Control (RLC) layer, a Packet Data Convergence Protocol (PDCP) layer, a Radio Resource Control (RRC) layer, or an application layer, and wherein the resource reservation period indicates a time interval between resources-to-be-reserved in a case that the processor performs the periodic resource reservation.

15. The non-transitory computer-readable storage medium according to claim 13, wherein the condition required by the first resource selection mode comprises a quantity of candidate time-frequency resources that meet a first listening condition among the to-be-selected time-frequency resources exceeds a first threshold, wherein the first listening condition comprises the processor listening on a first listening resource set, and wherein the first listening resource set is determined according to a specific resource reservation period set and time-frequency positions of the candidate time-frequency resources that meet the first listening condition.

16. The non-transitory computer-readable storage medium according to claim 13, wherein the processor performing the resource selection according to the second resource selection mode is configured to:

select, from the to-be-selected time-frequency resources, candidate time-frequency resources that meet a second listening condition and of which a quantity is not less than a second threshold, wherein the second listening condition comprises the processor listening on a second listening resource set, and wherein the second listening resource set is determined according to a specific resource reservation period set and time-frequency positions of the candidate time-frequency resources that meet the second listening condition, or is determined according to the time-frequency positions of the candidate time-frequency resources that meet the second listening condition.

17. The non-transitory computer-readable storage medium according to claim 13, wherein the processor performing the resource selection according to the second resource selection mode is configured to:

perform random resource selection among the to-be-selected time-frequency resources.

18. The non-transitory computer-readable storage medium according to claim 13, wherein the processor is further configured to:

indicate to a media access control (MAC) layer or a higher layer through a physical layer that the resource selection is performed according to the second resource selection mode in the resource selection process, wherein the higher layer comprises at least one of a Radio Link Control (RLC) layer, a Packet Data Convergence Protocol (PDCP) layer, a Radio Resource Control (RRC) layer, or an application layer.

* * * * *